United States Patent [19]
Lee

[11] Patent Number: 5,953,059
[45] Date of Patent: Sep. 14, 1999

[54] COLOR SIGNAL PROCESSING CIRCUIT WITH HUE/GAIN CONTROL AND FREQUENCY CONVERSION MECHANISMS

[75] Inventor: Kye Shin Lee, Seoul, Rep. of Korea

[73] Assignee: LG Semicon Co., Ltd., Chungcheongbuk-do, Rep. of Korea

[21] Appl. No.: 08/787,571

[22] Filed: Jan. 22, 1997

[30] Foreign Application Priority Data

May 2, 1996 [KR] Rep. of Korea ................... 96/14269

[51] Int. Cl.$^6$ .............................. H04N 5/262; H04N 9/73
[52] U.S. Cl. ................. 348/240; 348/223; 348/256; 348/646; 348/651; 348/655
[58] Field of Search ................... 348/222, 223, 348/229, 230, 239, 240, 254, 255, 256, 578, 580, 581, 582, 645, 646, 647, 649, 651, 655; H04N 5/262, 9/64, 9/68, 9/73

[56] References Cited

U.S. PATENT DOCUMENTS

| | | | |
|---|---|---|---|
| 5,319,449 | 6/1994 | Saito et al. ........................... | 348/223 |
| 5,325,182 | 6/1994 | Murata et al. ........................ | 348/663 |
| 5,845,011 | 12/1998 | Miyamoto et al. .................... | 348/240 |

OTHER PUBLICATIONS

Sony CXD 213 0R Data Sheet.

*Primary Examiner*—John W. Miller

[57] ABSTRACT

A color signal processing circuit of a camera DSP chip for use with a CCD includes a matrix circuit for converting color signals from the CCD into R-G and B-G signals, a hue/gain controlling circuit for multiplying the R-G signal by a R-hue coefficient and a R-gain coefficient and multiplying the B-G signal by a B-hue coefficient and a B-gain coefficient to form B-Y and R-Y signals by adding the R-G and B-G signals respectively multiplied by respective hue and gain coefficients, a zoom-processing circuit for zoom-processing the B-Y and R-Y signals converted in the hue/gain controlling circuit in a zoom mode, and a frequency converting circuit for synchronizing the B-Y and R-Y signals from the hue/gain controlling circuit or zoom-processed in the zoom-processing circuit with a clock having the frequency four times as large as a color burst signal to provide synchronized signals while loading the color burst signals. Thus, zoom data of the camera DSP chip is reduced by as many as 2 bits without affecting picture quality while decreasing the number of external pins on the DSP chip when the zoom-processing circuit is separate from the DSP chip. The B-Y and R-Y color difference signals are utilized as the zoom data in place of the R-G and B-G signals thereby facilitating the zoom processing and overall operation in the system application level.

18 Claims, 8 Drawing Sheets

MCK

CL output of subtracting section output of frequency converting section output of hue/gain controlling section

MCK output of subtracting section $\overline{Hfs}$

R−G in synch with $\overline{Hfs}$

R−G in synch with Hfs $\overline{Hfs/2}$ output of switch 45

MCK

CL

Hue/Gain controlling section

CL/2

B-Y in synch with $\overline{CL/2}$

R-Y in synch with CL/2 output of switch 64

COLOR SIGNAL PROCESSING CIRCUIT WITH HUE/GAIN CONTROL AND FREQUENCY CONVERSION MECHANISMS

BACKGROUND OF THE INVENTION

1. Field of the Invention

The present invention relates to a color signal processing circuit of a camera's digital signal processing (hereinafter referred to as "DSP") chip for use with a color charge coupled device (hereinafter referred to as "CCD") or other kinds of solid image pickup devices, and more particularly to a color signal processing circuit for controlling the hue/gain upon color difference signals to reproduce original colors, and for performing frequency conversion to decrease the number of zoom data bits.

2. Description of the Prior Art

A word "hue" corresponds to one of three elements of color, and designates the distinct visual sensation with respect to a particular color's wavelength. Hue is a characteristic useful for distinguishing colors from one another such as red, green and blue.

Accordingly, once the color of an object picked up by a CCD is to be reproduced, for example on a monitor of a television or personal computer (hereinafter referred to as PC), a color signal must be multiplied by preset hue/gain coefficients to reproduce accurately the original color.

The conventional color signal processing circuit of a camera DSP chip having the conventional hue/gain control & frequency converting circuit includes, as shown in FIG. 1, a switch & clamp section 11 for rearranging color signals Wb (obtained by R+G+2B, i.e., white based on blue), Gr (obtained by R+2G, i.e., green based on red), Wr (obtained by 2R+G+B, i.e., white based on red) and Gb (obtained by B+2G, i.e., green based on blue) into a signal based on the blue set Gb and Wb and a signal based on the red set Gr and Wr. A Cr/Cb matrix section 12 performs mutual subtraction of the color signals Gb, Wb, Wr and Gr supplied from switch & clamp section 11 to provide the signals in the form of Cr (obtained by Wr-Gb) and Cb (obtained by Wb-Gr). An RGB matrix section 13 converts the Cr and Cb signals into the color signals in the form of R, G and B. Then, an rb-ROM 14 imposes gamma upon the R and B signals from RGB matrix section 13, and a g-ROM 15 imposes the gamma upon the G signal from RGB matrix section 13. A subtracting section 16 subtracts the G signal gamma-corrected in g-ROM 15 from the R and B signals gamma-corrected in rb-ROM 14 to form color difference signals in the form of R-G and B-G. Either the R-G and B-G signals from subtracting section 16 or zoom-processed RG and B-G signals from zoom-processing section 18 are synchronized with 4*(fsc) (where fsc denotes a color burst signal which is 3.58 MHz in case of the NTSC; National Television Systems Committee Standard) in a frequency converting section 17. The zoom-processing section 18 zoom-processes the R-G and B-G signals for 10 bits from subtracting section 16 upon selection of a zoom mode and supplies the result to frequency converting section 17. In a hue/gain controlling section 19 of the color signal processing circuit, the 10-bit R-G and B-G signals synchronized with 4*(fsc) in frequency converting section 17 are multiplied by hue/gain coefficients for conversion into B-Y and R-Y signals of 8 bits. Also, an encoder 20 loads the color burst signals onto the B-Y and R-Y signals from hue/gain controlling section 19 to provide the resultant video signals.

Here, zoom-processing section 18 which performs the digital zoom function may consist of a separate single chip or belong to the internal system application level of a PC.

The color signal processing circuit constructed as shown in FIG. 1 receives the output of the CCD and provides color difference signals B-Y and R-Y and the color burst signals, which constitute video signals suitable for the NTSC and PAL (Phase Alternation Line) standards.

In more detail, switch & clamp section 11 rearranges color signals Wb, Gr, Wr and Gb subjected to a color filter of the CCD into blue-tinged signals Gb and Wb and red-tinged signals Wr and Gr, and provides the rearranged signals to Cr/Cb matrix section 12.

Cr/Cb matrix section 12 executes the mutual substraction of the rearranged color signals Gb, Wb, Wr and Gr from switch & clamp section 11 to produce signals in the form of Cr and Cb. Then, RGB matrix section 13 utilizes the Cr and Cb signals to generate color signals in the form of R,G,B.

At this time, rb-ROM 14 imposes the gamma upon the R and B signals from RGB matrix section 13, and g-ROM 15 imposes the gamma upon the G signal from RGB matrix section 13.

Subtracting section 16 subtracts the green (G) signal gamma-corrected in g-ROM 15 from the red (R) and blue (B) signals gamma-corrected in rb-ROM 14 to produce the signals in the form of R-G and B-G.

That is, the R-G and B-G signals from subtracting section 16 as shown in FIG. 2C have 10 bits, which are synchronized with a main clock MCK shown in FIG. 2A. The main clock MCK is preferably a pixel clock of the CCD.

Main clock MCK is (8/3)fsc in case of a 250,000 pixel CCD, and 4fsc for 380,000 pixels. Here, fsc denotes the color subcarrier, which is 3.58 MHz for NTSC.

Since the color can be accurately reproduced only when the color signal has a phase corresponding to the color burst signal, the R-G and B-G signals should be synchronized with a clock CL (FIG. 2B) having a frequency four times as fast as the color burst signal fsc. This operation is performed in frequency converting section 17.

More specifically, frequency converting section 17 synchronizes the 10 bit R-G and B-G signals from subtracting section 16 with a clock CL(=4fsc) as shown in FIG. 2B to provide synchronized signals in the form shown in FIG. 2D. Here, upon shifting into the zoom mode, zoom-processing section 18 processes the 10 bit R-G and B-G signals and provides the processed signals to frequency converting section 17 which, in turn, synchronizes the 10 zoom-processed R-G and B-G bits with clock CL in the same manner as the ordinary unprocessed signals to arrange the signals in the order of R-$G_0$, R-$G_0$, B-$G_0$, B-$G_1$, R-$G_2$, R-$G_2$, ... See FIG. 2D In hue/gain controlling section 19, the R-G signal having the frequency and bit arrangement shown in FIG. 2D is multiplied by a R-hue coefficient and a R-gain coefficient. Then, the B-G signal is multiplied by a B-hue coefficient and a B-gain coefficient, and the R-G and B-G signals respectively multiplied by the different hue and gain coefficients are added to each other to form the B-Y and R-Y signals, thereby providing signals in the order of B-$Y_0$, R-$Y_0$, B-$Y_1$, ..., as shown in FIG. 2E.

Here, the R-hue coefficient, R-gain coefficient, B-hue coefficient and B-gain coefficient are constants different from one another. The R-G signal multiplied by the R-hue coefficient is added to the B-G signal multiplied by the B-gain coefficient to form the B-Y signal having 8 bits. The R-G signal multiplied by the R-gain coefficient is added with the B-G signal multiplied by the B-hue coefficient to form the R-Y signal having 8 bits.

Thereafter, encoder 20 loads the color burst signals onto the B-Y and R-Y signals from hue/gain controlling section 19 to provide the color video signals suited to the NTSC and PAL standards.

Here, encoder 20 includes a frequency converting circuit, a phase shifting circuit for providing a phase shift with respect to the burst signal, and a burst signal generating circuit for converting the signal frequency into 5/4 times the speed of clock CL when in the PAL mode.

However, the above-described color signal processing circuit as shown in FIG. 1 has a drawback of increasing the external pins on the DSP chip because the zoom interface must communicate 10 bits (of the R-G and B-G signals) to zoom-processing section 19 when the latter is external to the DSP chip.

Furthermore, in the system application level, i.e., in reproducing the color of the CCD-sensed object onto the monitor of a PC, the R-G and B-G signals of 10 bits are utilized as the zoom data, thereby making the zoom processing laborious and difficult.

SUMMARY OF THE INVENTION

The present invention is devised to solve the foregoing problems. It is an object of the present invention to provide a color signal processing circuit wherein the hue-gain is primarily controlled upon 10-bit R-G and B-G signals to form 8-bit B-Y and R-Y signals synchronized with a clock of 4fsc. This decreases the number of zoom data bits and allows the zoom data to be sent outside the DSP chip in the form of B-Y and R-Y for simplified processing in the system level.

To achieve the above object of the present invention, a color signal processing circuit for converting color R-G and B-G signals into B-Y and R-Y signals includes a hue/gain controlling section for multiplying the R-G signals by a R-hue coefficient and a R-gain coefficient, multiplying the B-G signals by a B-hue coefficient and a B-gain coefficient, and adding the results of the multiplications to obtain B-Y and R-Y signals. Also, a zoom-processing section zoom-processes the B-Y and R-Y signals converted in the hue/gain controlling section in a zoom mode, and a frequency converting section synchronizes the B-Y and R-Y signals from the hue/gain controlling section or the zoom-processed B-Y and R-Y signals from the zoom-processing section with a CL clock having a frequency four times as fast as a color burst signal, and outputs the synchronized signals by loading the burst signals.

According to another aspect of the present invention, a color signal processing circuit includes a matrix section for converting signals Wb (=R+G+2B), Gr (=R+2G), Wr (=2R+G+B) and Gb (=B+2G) supplied from an image signal source into R, G and B signals. Also, a gamma-correcting section gamma-corrects the R, G and B signals from the matrix section, and converts the gamma-corrected R, G and B signals into signals in the form of R-G and B-G by subtracting the G signal from R signal and by subtracting the G signal from the B signal. In addition, the color signal processing circuit includes hue/gain controlling section for multiplying the R-G signal by a R-hue coefficient and a R-gain coefficient, multiplying the B-G signal by a B-hue coefficient and a B-gain coefficient, and adding the R-G and B-G signals respectively multiplied by respective hue and gain coefficients to produce B-Y and R-Y signals. Then, a zoom-processing section zoom-processes the B-Y and R-Y signals produced by the hue/gain controlling section upon selection of a zoom mode, and a frequency converting section synchronizes the B-Y and R-Y signals from the hue/gain controlling section or the zoom-processed B-Y and R-Y signals from the zoom-processing section with a CL clock having a frequency four times as fast as a color burst signal, and outputting the synchronized signals by loading the color burst signals.

BRIEF DESCRIPTION OF THE DRAWINGS

The above objects and other advantages of the present invention will become more apparent by describing in detail preferred embodiments thereof with reference to the attached drawings, in which.

DETAILED DESCRIPTION OF THE PREFERRED EMBODIMENTS

Figure 3:
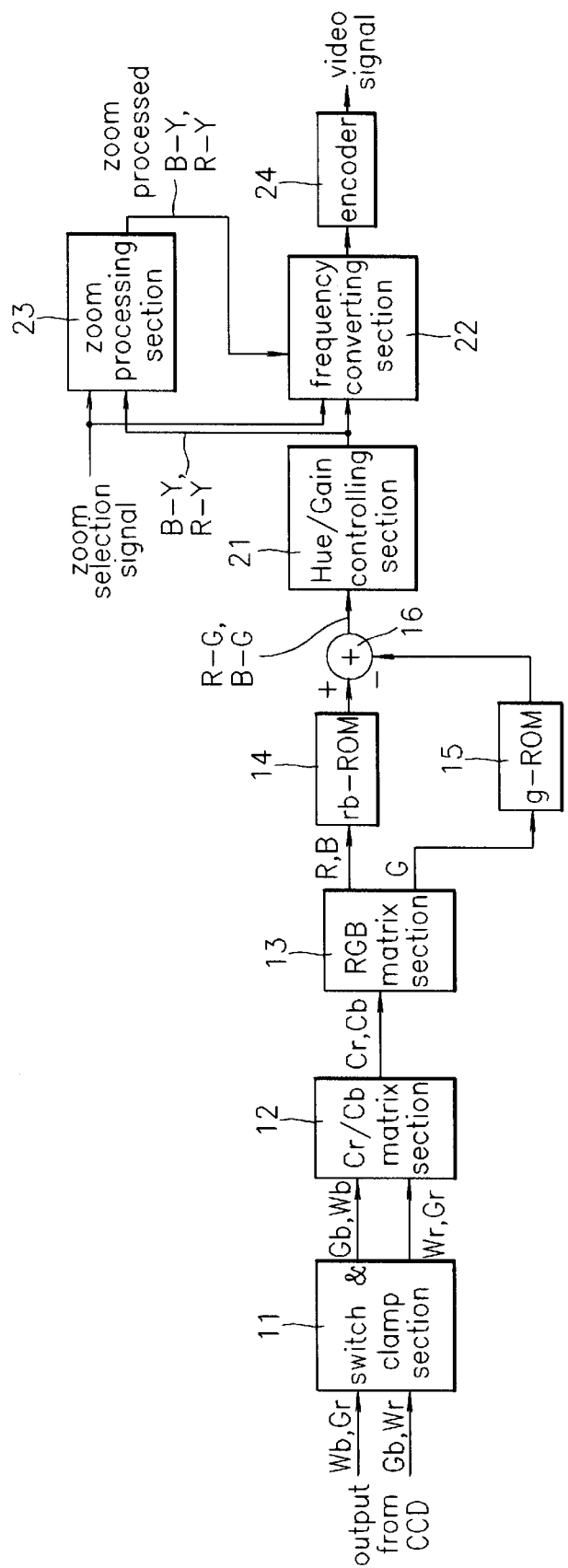
FIG. 3 is a block diagram showing a construction of a color signal processing circuit according to the present invention.

Referring to FIG. 3, a construction of a color signal processing circuit according to the present invention will be described. Although the following description mentions a charge-coupled device (CCD) and signals produced by a CCD, it should be understood that other image signal sources may be used regardless whether they themselves capture the image to be processed. Similarly, the inventive circuits may be adapted for use with signals analogous to those produced by CCD without straying from the inventive concepts disclosed herein.

In FIG. 3, the color signal processing circuit includes a switch & clamp section 11 for rearranging the color signals Wb (obtained by R+G+2B, i.e., white based on blue), Gr (obtained by R+2G, i.e., green based on red), Wr (obtained by 2R+G+B, i.e., white based on red) and Gb (obtained by B+2G, i.e., green based on blue) into a signal based upon the blue set Gb and Wb and a signal based upon the red set Gr and Wr. A Cr/Cb matrix section 12 performs mutual subtraction of the color signals Gb, Wb, Wr and Gr supplied from switch & clamp section 11 to provide the resultant signals in the form of Cr (obtained by Wb-Gr) and Cb (obtained by Wr-Gb). An RGB matrix section 13 converts the Cr and Cb signals into the color signals in the form of R, G and B. Then, an rb-ROM 14 imposes gamma upon the R and B signals from RGB matrix section 13, and a g-ROM 15 imposes the gamma upon the G signal from RGB matrix section 13. A subtracting section 16 subtracts the G signal gamma-corrected in g-ROM 15 from the R and B signals gamma-corrected in rb-ROM 14 to form color difference signals in the form of R-G and B-G. The R-G and B-G signals from subtracting section 16 have 10 bits and are multiplied by hue/gain coefficients so that they may be combined into B-Y and R-Y signals of 8 bits in length in a hue/gain controlling section 21. Either the B-Y and R-Y signals synchronized with a main clock MCK from hue/gain controlling section 21 or zoom-processed B-Y and R-Y signals from a zoom-processing section 23 are synchronized with 4(fsc) (where fsc denotes a color burst signal which is 3.58 MHz in case of the NTSC) in a frequency converting section 22. A zoom-processing section 23 zoom-processes the 8-bit B-Y and R-Y signals from hue/gain controlling section 21 upon selection-of the zoom mode and supplies the result to frequency converting section 22. Also, an encoder 24 loads the color burst signals onto the B-Y and R-Y signals synchronized to a clock CL (=4fsc) from frequency converting section 22 and outputs the resultant video signals.

In other words, the color signal processing circuit according to the present invention forces the R-G and B-G signals output from the subtracting section 16 to pass through the hue/gain controlling section 21 without synchronizing them with clock CL to thereby form the B-Y and R-Y signals synchronized with main clock MCK. Then, for synchronizing the resultant signals with clock CL, hue/gain controlling section 21 forwards the signals to the frequency converting section 22.

In addition, the zoom data becomes the output of hue/gain controlling section 21, which is the B-Y and R-Y signals of 8 bits.

Figure 1:
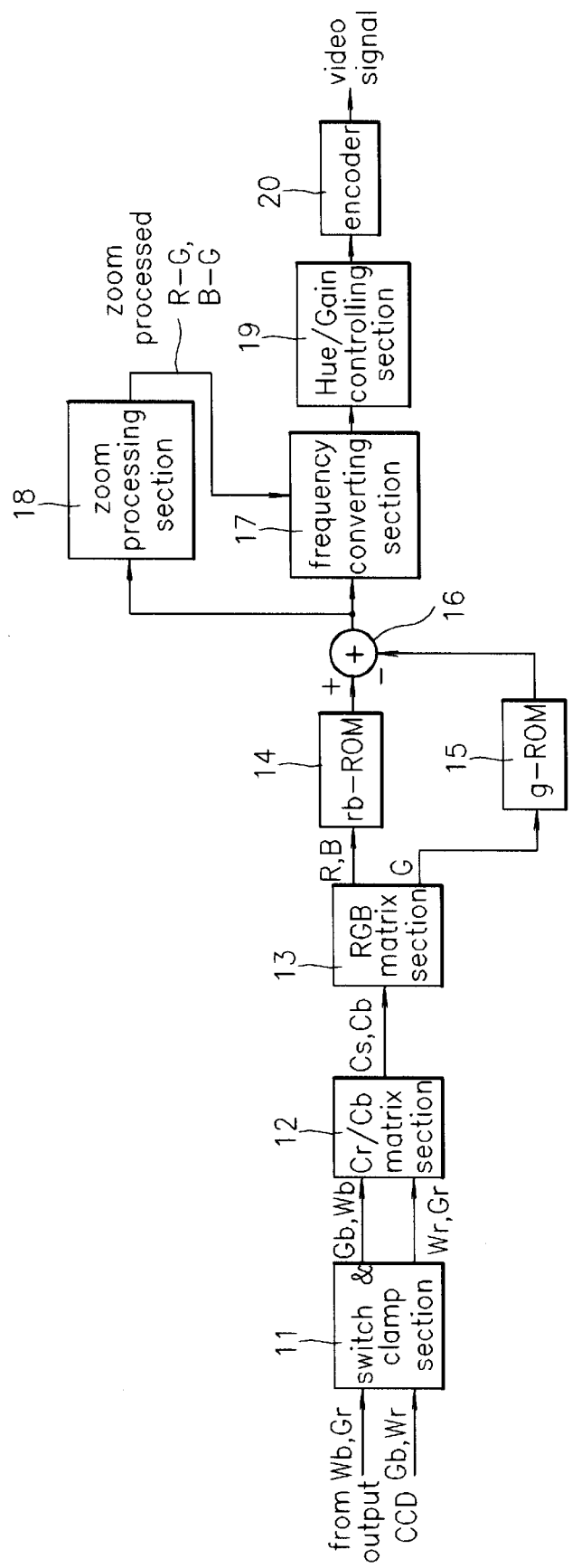
FIG. 1 is a block diagram showing a construction of a conventional color signal processing circuit.
Figure 2A:
FIGS. 2A–2E are operational timing charts of respective sections shown in FIG. 1.
Figure 2B:
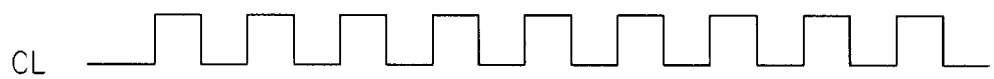
Figure 2C:
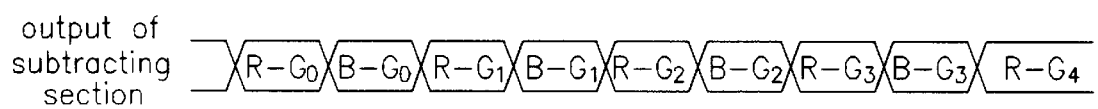
Figure 2D:
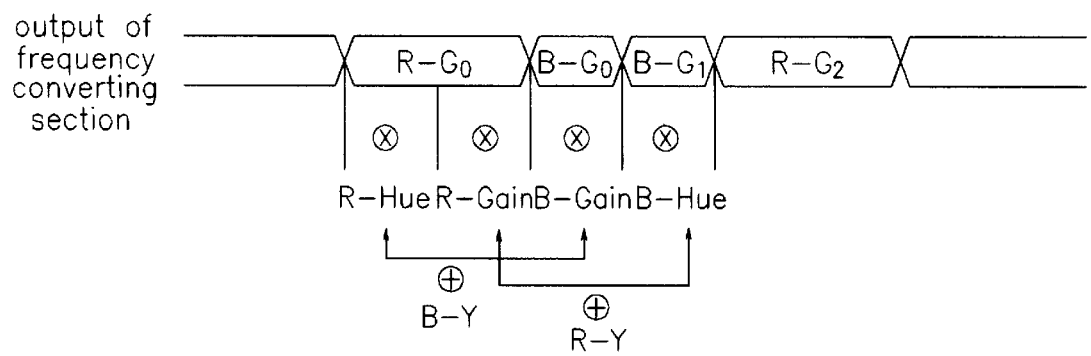
Figure 2E:
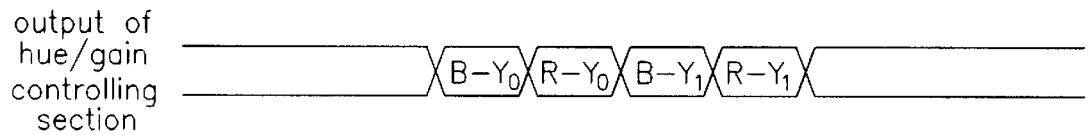

Here, respective sections except for hue/gain controlling section 21 and frequency converting section 22 are identical to those of the conventional color signal processing circuit shown in FIG. 1.

Figure 4:
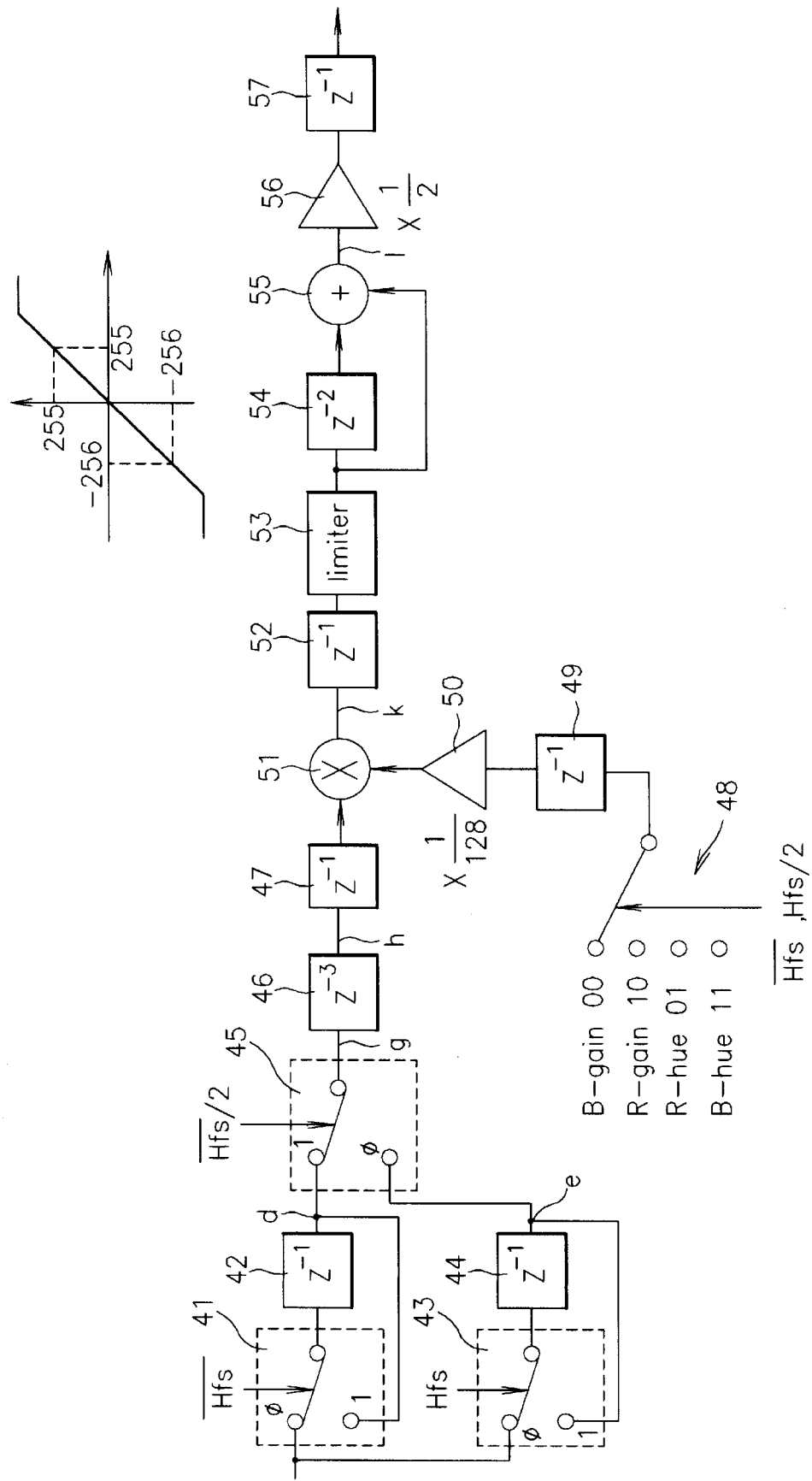
FIG. 4 is a detailed block diagram showing the hue/gain controlling section of FIG. 3.

Hue/gain controlling section 21, as shown in FIG. 4, includes a switch 41 and a latch 42 for switching the R-G signal from subtracting section 16 at a clock Hfs which is one-half the frequency of main clock $\overline{MCK}$. A switch 43 and a latch 44 switch the B-G signal from subtracting section 16 at a clock Hfs having a frequency one-half that of main clock MCK. A switch 45 switches the R-G and B-G signals switched with clocks $\overline{Hfs}$ and Hfs with a clock $\overline{Hfs}/2$ having one half the frequency of clock $\overline{Hfs}$ to re-arrange the signals in the form of R-$G_0$, R-$G_0$, B-$G_0$, B-$G_1$, . . . A latch 46 delays the output of switch 45 by as many as three clocks, and a latch 47 delays the output of latch 46 by as many as one clock. A switch 48 selectively provides B-gain, R-gain, B-hue and R-hue coefficients in accordance with the timing of clocks $\overline{Hfs}$ and Hfs/2. Then, a latch 49 delays the output of switch 48 by as many as one clock, and an amplifier 50 multiplies the output of latch 49 by an optional constant (e.g., 1/128). A multiplier 51 multiplies any one among the B-gain, R-gain, B-hue and R-hue coefficients supplied from amplifier 5O to either one of the R-G or B-G signal from latch 47. A latch 52 delays the output of multiplier 51 by as many as one clock, and a limiter 53 allows the R-G and B-G signals of 10 bits multiplied with the hue/gain coefficients from latch 52 to become color difference signals of 8 bits in length. A latch 54 delays the output of limiter 53 by two clocks, and an adder 55 adds the delayed color difference signals to the color difference signals received directly from limiter 53 to obtain B-Y and R-Y signals having 9-bit lengths. Additionally, an amplifier 56 multiplies the B-Y and R-Y signals from adder 55 by one-half to provide the B-Y and R-Y signals in their final 8-bit form. A latch 57 delays the output of amplifier 56 by as many as one clock.

Figure 6:
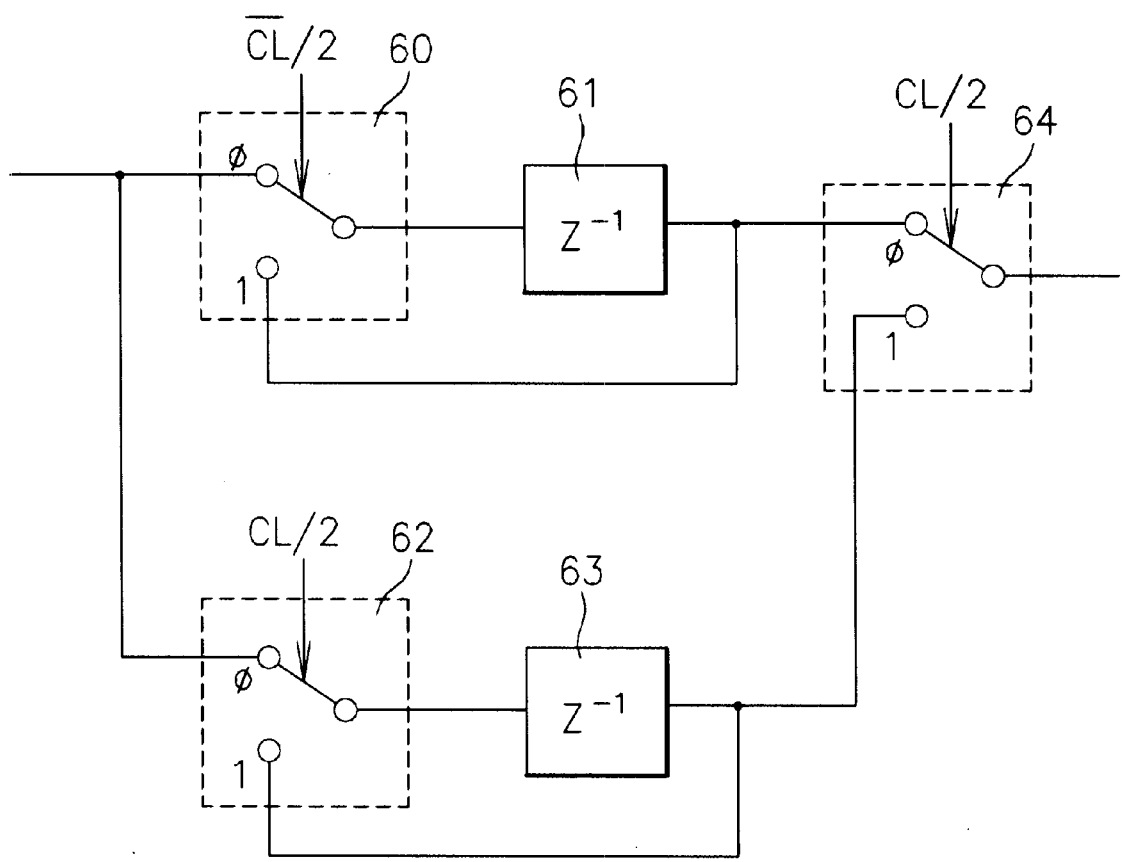
FIG. 6 is a detailed block diagram showing the frequency converting section of FIG. 3.

Here, since latches 42, 44, 46, 47, 49, 52, 54 and 57 are operated by main clock MCK, the delay by as many as one clock denotes a delay for one period of main clock MCK. Frequency converting section 22, as shown in FIG. 6, includes a switch 60 and a latch 61 for switching the B-Y signal from hue-gain controlling section 21 with a clock CL/2. In addition, a switch 62 and a latch 63 switch the R-Y signal from hue/gain controlling section 21 with a clock CL/2 to provide the result, and a switch 64 switches the B-Y and R-Y signals respectively supplied from latches 61 and 63 with clock CL/2 to synchronize the switched signals with clock CL (=4fsc) prior to being output therefrom.

In the color signal processing circuit according to the present invention, the frequency conversion is executed after the color difference signals are produced. Therefore, the number of zoom data bits is decreased without affecting picture quality to provide the color difference signals B-Y and R-Y and color burst signals which are video signals suitable for the NTSC and PAL standards as the final output.

That is, switch & clamp section 11 re-arranges color signals Wb (which is R+G+2B, i.e., white based on blue), Gr (which is R+2G, i.e., green based on red), Wr (which is 2R+G+B, i.e., white based on red) and Gb (which is B+2G, i.e., green based on blue) having passed through the color filter of the CCD into signals of a blue set Gb and Wb and signals of a red set Wr and Gr, thereby providing the rearranged signals to Cr/Cb matrix section 12.

Cr/Cb matrix section 12 performs the mutual subtraction of the rearranged color signals Gb, Wb, Wr and Gr from switch & clamp section 11 to produce signals in the form of Cr (obtained by Wr-Gb) and Cb (obtained by Wb-Gr) which are then converted into the color signals in the form of R, G and B in RGB matrix section 13.

At this time, rb-ROM 14 imposes the gamma upon the R and B signals from RGB matrix section 13, and g-ROM 15 imposes the gamma upon the G signal from RGB matrix section 13.

Figure 5A:
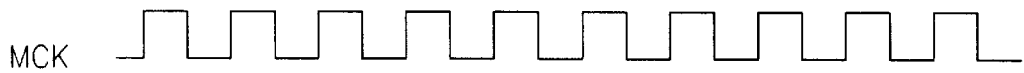
FIGS. 5A–5L are operational timing charts of respective sections shown in FIG. 3.
Figure 5B:
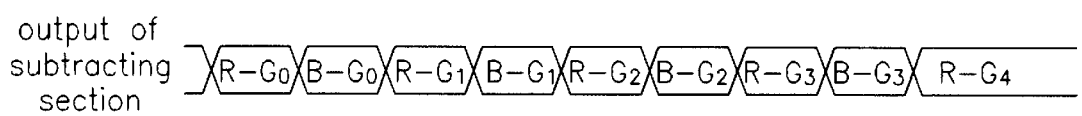
Figure 5C:
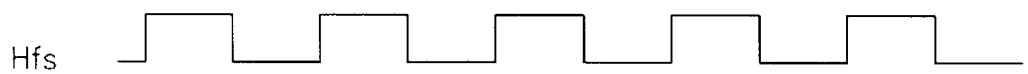

Subtracting section 16 subtracts the G signal gamma-corrected in g-ROM 15 from the R and B signals gamma-corrected in rb-ROM 14 to form the color difference signals in the form of R-G and B-G as shown in FIG. 5B.

In FIG. 5B the R-G and B-G signals from subtracting section 16 are 10 bits long, and are synchronized with main clock MCK shown in FIG. 5A, which is the pixel clock of the CCD.

At this time, hue/gain controlling section 21 multiplies the R-hue coefficient and R-gain coefficient to the 10-bit R-G signals from subtracting section 16, and the B-gain coefficient and B-hue coefficient to the 10-bit B-G signals, so that the R-G and B-G signals respectively multiplied with the different hue and gain coefficients can be added to each other to form the 8-bit B-Y and R-Y signals.

Figure 5D:
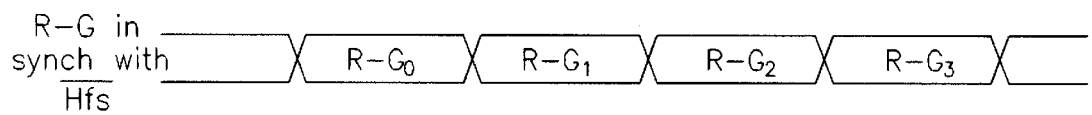

More specifically, the R-G signal from subtracting section 16 as shown in FIG. 5B becomes the R-G signals synchronized with clock $\overline{Hfs}$ as shown in FIG. 5D via switch 41 of hue/gain controlling section 21, which is switched by clock $\overline{Hfs}$ having the frequency one-half that of main clock $\overline{MCK}$. The latch 42 delays the output of switch 41 by as many as one clock.

In other words, when clock $\overline{Hfs}$ is low, the R-G signal is delayed by as many as one clock via latch 42; otherwise, if it is high, the R-G signal is provided without being delayed to obtain the R-G signal synchronized with clock $\overline{Hfs}$ as shown in FIG. 5D.

Figure 5E:
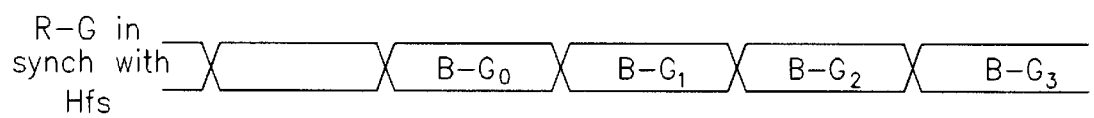

Meanwhile, the B-G signal from subtracting section 16 as shown in FIG. 5B becomes the B-G signal synchronized with clock Hfs as shown in FIG. 5E via switch 43 of hue/gain controlling section 21, which is switched by clock Hfs having the frequency one-half that of main clock MCK. The latch 44 delays the output of switch 43 by as many as one clock.

In other words, when clock Hfs is low, the B-G signal is delayed by as many as one clock via latch 44; otherwise, if it is high, the B-G signal is provided without being delayed to obtain the B-G signal synchronized with clock Hfs as shown in FIG. 5E.

Figure 5F:
Figure 5G:
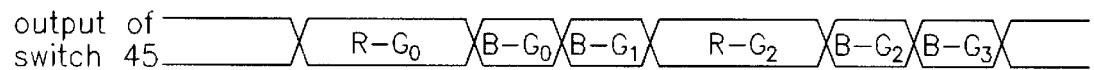

Switch 45 switches the R-G signal and B-G signal respectively synchronized with clocks $\overline{Hfs}$ and Hfs as shown in FIGS. 5D and 5E with clock $\overline{Hfs}/2$ as shown in FIG. 5F, thereby rearranging the signals in the form of R-$G_0$, R-$G_0$, B-$G_0$, B-$G_1$, . . . , as shown in FIG. 5G.

Figure 5H:
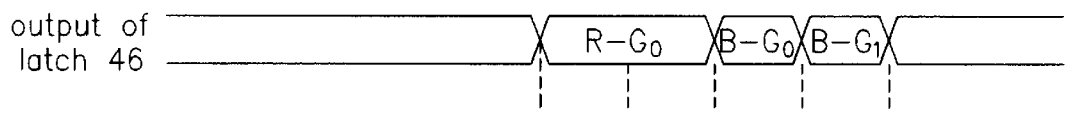

The R-G and B-G signals rearranged in switch 45 as shown in FIG. 5G are delayed by as many as three clocks as shown in FIG. 5H by latch 46 and then delayed again by as many as one clock in latch 47 to be supplied to multiplier 51.

Figure 5I:
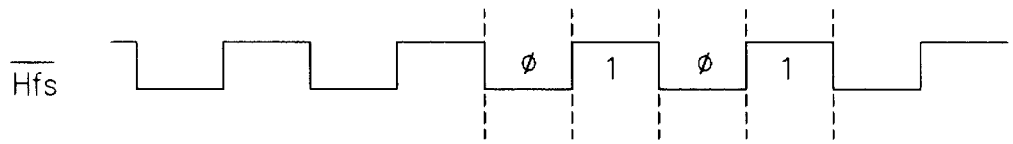
Figure 5J:
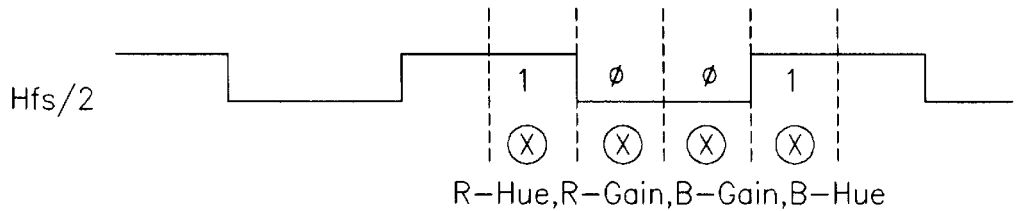

On the other hand, switch 48 selectively provides the R-hue coefficient, R-gain coefficient, B-hue coefficient and B-gain coefficient in accordance with the combination of clock $\overline{Hfs}$ as shown in FIG. 5I and clock Hfs/2 as shown in FIG. 5J in such a manner that the R-hue coefficient is supplied when the logic value of the two clocks $\overline{Hfs}$ and Hfs/2 is 01, the R-gain coefficient in case of 10, the B-hue coefficient in case of 11 and the B-gain coefficient in case of 00.

Here, the R-hue coefficient, R-gain coefficient, B-hue gain coefficient and B-gain coefficient are respective constants typically different from one another.

Then, the R-hue coefficient, R-gain coefficient, B-hue coefficient and B-gain coefficient selectively supplied from switch 48 are delayed by as many as one clock in latch 49 and multiplied by constant 1/128 in amplifier 50 before being provided to multiplier 51.

Figure 5K:
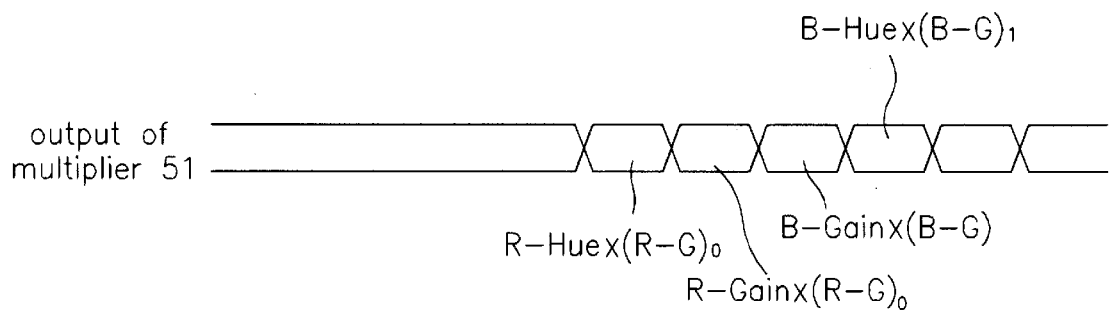

Thus, multiplier 51 multiplies the R-hue coefficient and R-gain coefficient to the 10-bit R-G signal as shown in FIG. 5K, and the B-gain coefficient and B-hue coefficient to the B-G signal. Then, the resultant signals are delayed by as many as one clock in latch 52 before being provided to limiter 53.

Limiter 53 eliminates the most significant 2 bits of the 10-bit R-G and B-G signals respectively multiplied by the hue/gain coefficients from latch 52 to make them 8 bits long.

Figure 5L:
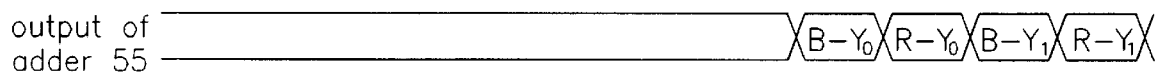

The output of limiter 53 is delayed by two clocks by latch 54 and supplied into adder 55 which adds the color difference signal delayed by two clocks to the color difference signal directly supplied from limiter 54 without being delayed, thereby forming the B-Y and R-Y signals as shown in FIG. 5L.

That is, latch 54 and adder 55 are for forming the color difference signals in the form of B-Y and R-Y by adding the R-G and B-G signals respectively multiplied by the different hue/gain coefficients, in which adder 55 adds the R-G signal multiplied by the R-hue coefficient to the B-G signal multiplied by the B-gain coefficient to form the color difference signal in the form of B-Y, and adds the R-G signal multiplied by the R-gain coefficient to the B-G signal multiplied by the B-hue coefficient to form the R-Y signal.

Since adder 55 adds the two 8-bit color difference signals, the output of adder 55 becomes the B-Y and R-Y signals of 9 bits in length.

Amplifier 56 multiplies the 9-bit B-Y and R-Y signals from adder 55 by one-half (1/2) to form the 8-bit long B-Y and R-Y signals and latch 56 delays them by as many as one clock to provide the delayed signals to frequency converting section 22.

The 8-bit B-Y and R-Y signals from hue/gain controlling section 21 are synchronized with main clock MCK, and are utilized as the zoom data in zoom-processing section 23.

At this time, the color can be exactly reproduced when the B-Y and R-Y signals from hue/gain controlling section 21 have phases corresponding to the color burst signals. For this reason, the B-Y and R-Y signals should be synchronized with clock CL having the frequency four times as large as color burst signal fsc, which synchronization is carried out in frequency converting section 22.

Figure 7A:
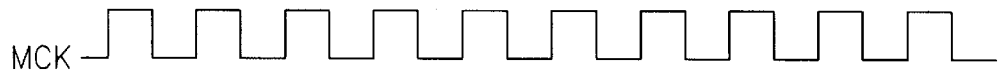
FIGS. 7A–7G are operational timing charts of respective sections shown in FIG. 6.
Figure 7B:
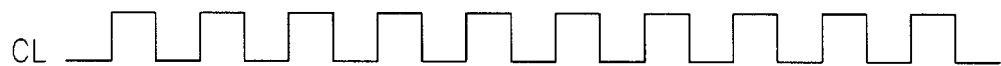
Figure 7C:
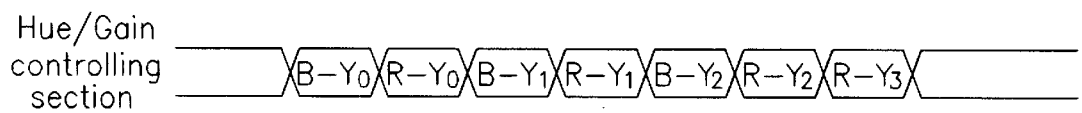
Figure 7D:
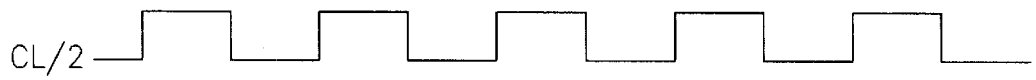
Figure 7E:
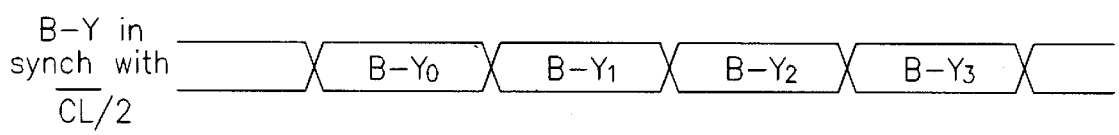

That is, the 8-bit B-Y signal as shown in FIG. 7C from hue/gain controlling section 21 becomes the B-Y signal synchronized with clock $\overline{CL}/2$ as shown in FIG. 7E via switch 60 of the frequency converting section 22. Switch 60 is switched by clock $\overline{CL}/2$ having the frequency one-half that of $\overline{CL}$ and latch 61 delays the output of switch 60 by as many as one clock, i.e., by as much as one full cycle of main clock MCK shown in FIG. 7A.

More specifically, when clock $\overline{CL}/2$ which is the control signal of switch 60 is low, the B-Y signal is delayed by as many as one clock via latch 61; otherwise, if it is high, the B-Y signal is directly provided without being delayed to obtain the B-Y signal synchronized with clock $\overline{CL}/2$ as shown in FIG. 7E.

Figure 7F:
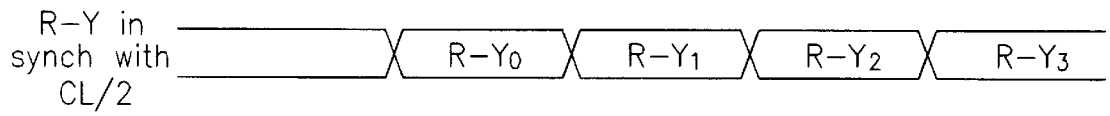

Then, the 8-bit R-Y signal as shown in FIG. 7C from hue/gain controlling section 21 becomes synchronized with clock CL/2 as shown in FIG. 7F via switch 62, which is switched by clock CL/2 having the frequency one-half that of clock CL. Latch 63 delays the output of switch 62 by as many as one clock.

More specifically, when clock CL/2 is low, the R-Y signal is delayed by as many as one clock via latch 63; otherwise, if it is high, the R-Y signal is directly supplied without being delayed to obtain the R-Y signal synchronized with clock CL/2 as shown in FIG. 7F.

Figure 7G:
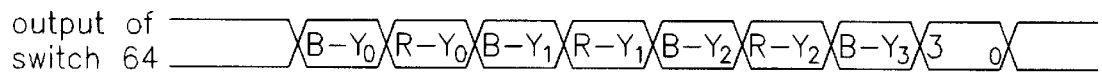

Thereafter, switch 64 switches the B-Y and R-Y signals respectively synchronized with clocks $\overline{CL}/2$ and CL/2 as shown in FIGS. 7E and 7F with clock CL/2 shown in FIG. 7D to provide the signals in the order of B-Y, R-Y, B-Y, . . . , synchronized with clock CL as shown in FIG. 7G.

Here, upon selection of the zoom mode, zoom-processing section 23 zoom-processes the 8-bit B-Y and R-Y signals from hue/gain controlling section 21 and supplies the result to frequency converting section 22 which, in turn, synchronizes the zoom-processed 8-bit B-Y and R-Y signals with clock CL to provide signals in the order B-Y, R-Y, B-Y, R-Y, . . . , which is the same order as the conventional case.

At this time, encoder 24 loads the color burst signals onto the B-Y and R-Y signals from frequency converting section 22 to provide the final color difference signals.

Here, encoder 24 includes a frequency converting circuit for converting the frequency by 5/4 of CL (which is 4fsc) in case of the PAL mode, a phase converting circuit which changes the phase with respect to the burst signal, and a burst signal generating circuit.

In the color signal processing circuit according to the present invention as described above, after the hue/gain control is performed upon the R-G and B-G signals to generate the B-Y and R-Y signals, the frequency conversion for synchronizing the obtained signals with clock CL having the frequency four times as large as the color burst signals is carried out. Therefore, the zoom data of the camera DSP chip is decreased by as many as 2 bits without affecting picture quality while decreasing the number of external pins on the DSP chip when the zoom-processing section is separate from the chip.

Furthermore, in the system application level, the B-Y and R-Y signals are utilized as the zoom data in place of the R-G and B-G signals to facilitate the zoom processing operation.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A color signal processing circuit for converting color R-G and B-G signals into B-Y and R-Y signals, comprising:

hue/gain controlling means for multiplying R-G signals by a R-hue coefficient and a R-gain coefficient, multiplying B-G signals by a B-hue coefficient and a B-gain coefficient, and adding results of the multiplications to obtain B-Y and R-Y signals;

zoom-processing means for zoom-processing said B-Y and R-Y signals and providing zoom-processed B-Y and R-Y signals; and frequency converting means operatively connected to said hue/gain controlling means and said zoom-processing means, for synchronizing said B-Y and R-Y signals from said hue/gain controlling means or said zoom-processed B-Y and R-Y signals with a clock having a frequency four times as fast as a color burst signal, and outputting the synchronized signals, wherein the clock is labeled a CL clock and said frequency converting means includes, a first switch and a first latch for synchronizing said B-Y signal with a clock $\overline{CL}/2$ obtained by dividing inverted clock $\overline{CL}$ by two to provide a B-Y synchronized signal, a second switch and a second latch for synchronizing said R-Y signal with a clock CL/2 obtained by dividing said CL clock by two to provide a R-Y synchronized signal, and a third switch for switching said synchronized B-Y and R-Y signals with said CL/2 clock, thereby outputting B-Y and R-Y signals synchronized with said CL clock.

2. A color signal processing circuit as claimed in claim 1, wherein each of said R-G and B-G signals is 10 bits long and further wherein said hue/gain controlling means converts said R-G and B-G signals into said B-Y and R-Y signals having only 8 bits.

3. A color signal processing circuit as claimed in claim 1, wherein said processing circuit is for use with a charge-coupled device having a pixel clock, said B-Y and R-Y signals from said hue/gain controlling means being synchronized with the pixel clock.

4. A color signal processing circuit as claimed in claim 1, wherein said processing circuit is for use with an image signal source having a pixel clock, and further wherein said hue/gain controlling means includes:

a first switch and a first latch for synchronizing said R-G signals with a $\overline{Hfs}$ clock having a frequency one-half of the inverted pixel clock to provide R-G synchronized signals;

a second switch and a second latch for synchronizing said B-G signals with a Hfs clock having a frequency one-half of the pixel clock to provide B-G synchronized signals;

a third switch for switching said synchronized R-G and B-G signals in accordance with a clock $\overline{Hfs}/2$ having a frequency one-half of the $\overline{Hfs}$ clock to rearrange the synchronized R-G and B-G signals into the order R-G, R-G, B-G, B-G, . . . ;

a delay for delaying an output of said third switch;

a selector for selectively providing said B-gain, R-gain, B-hue and R-hue coefficients based upon said $\overline{Hfs}$ and Hfs/2 clocks;

a multiplier for multiplying said ordered R-G or B-G signal from said delay by any one among said B-gain, R-gain, B-hue and R-hue coefficients provided by said selector;

a limiter for limiting said R-G and B-G signals after being multiplied by the hue/gain coefficients in said multiplier and for outputting limited R-G and B-G signals; and a converter for adding said limited R-G and B-G signals and converting the added R-G and B-G signals into said B-Y and R-Y signals.

5. A color signal processing circuit as claimed in claim 4, wherein said limited R-G and B-G signals are color difference signals and said converter includes:

a second delay for delaying an output of said limiter by as many as two periods of said pixel clock; and an adder for adding the color difference signals from said limiter to the color difference signals from said second delay.

6. A color signal processing circuit as claimed in claim 4, wherein said R-G and B-G signals are each 10 bits long, and said limited R-G and B-G signals output from said limiter are each 8 bits long.

7. A color signal processing circuit as claimed in claim 1, wherein said zoom-processing means zoom-processes 8 bits of said B-Y and R-Y signals.

8. A color signal processing circuit as claimed in claim 1, wherein said hue/gain controlling means receives said R-G and B-G signals from a charge coupled device.

9. A color signal processing circuit as claimed in claim 1, wherein said zoom-processing means selectively zoom-processes said B-Y and R-Y signals in response to a zoom selection signal indicating selection of a zoom mode.

10. A color signal processing circuit comprising:

matrix means for converting signals Wb (=R+G+2B), Gr (=R+2G), Wr (=2R+G+B) and Gb (=B+2G) supplied from an image signal source into R, G and B signals;

gamma-correcting means for gamma-correcting said R, G and B signals from said matrix means, and for converting said gamma-corrected R, G and B signals into signals in the form of R-G and B-G by subtracting the G signal from R signal and by subtracting said G signal from the B signal;

hue/gain controlling means for multiplying the R-G signal by a R-hue coefficient and a R-gain coefficient, multiplying the B-G signal by a B-hue coefficient and a B-gain coefficient, and adding said R-G and B-G signals respectively multiplied by respective hue and gain coefficients to produce B-Y and R-Y signals;

zoom-processing means for zoom-processing said B-Y and R-Y signals and providing zoom-processed B-Y and R-Y signals; and frequency converting means operatively connected to said hue/gain controlling means and said zoom-processing means, for synchronizing said B-Y and R-Y signals or said zoom-processed B-Y and R-Y signals with a CL clock having a frequency four times as fast as a color burst signal, and outputting the synchronized signals, wherein said frequency converting means includes, a first switch and a first latch for synchronizing said B-Y signal with a clock $\overline{CL}/2$ obtained by dividing inverted clock $\overline{CL}$ by two to provide a synchronized B-Y signal, a second switch and a second latch for synchronizing said R-Y signal with a clock CL/2 obtained by dividing said CL clock by two to provide a synchronized R-Y signal, and a third switch for switching said synchronized B-Y and R-Y signals with said CL/2 clock, thereby outputting B-Y and R-Y signals synchronized with said CL clock.

11. A color signal processing circuit as claimed in claim 10, wherein each of said R-G and B-G signals is 10 bits long, and said hue/gain controlling means converts said R-G and B-G signals into said B-Y and R-Y signals having only 8 bits.

12. A color signal processing circuit as claimed in claim 10, wherein said B-Y and R-Y signals from said hue/gain controlling means are synchronized with a pixel clock of said image signal source.

13. A color signal processing circuit as claimed in claim 10, wherein said hue/gain controlling means includes:

a first switch and a first latch for synchronizing said R-G signals with a $\overline{Hfs}$ clock having a frequency one-half of an inverted pixel clock of said image signal source to provide R-G synchronized signals;

a second switch and a second latch for synchronizing said B-G signals with a Hfs clock having a frequency one-half of a pixel clock of said image signal source to provide B-G synchronized signals;

a third switch for switching said synchronized R-G and B-G signals in accordance with a clock $\overline{Hfs}$/2 having a frequency one-half of the $\overline{Hfs}$ clock to rearrange the synchronized R-G and B-G signals into the order R-G,-R-G, B-G, B-G, . . . ;

a delay for delaying an output of said third switch;

a selector for selectively providing said B-gain, R-gain, B-hue and R-hue coefficients based upon said $\overline{Hfs}$ and Hfs/2 clocks;

a multiplier for multiplying said ordered R-G or B-G signal from said delay by any one among said B-gain, R-gain, B-hue and R-hue coefficients provided by said selector;

a limiter for converting said R-G and B-G signals after being multiplied by the hue/gain coefficients in said multiplier and for outputting limited R-G and B-G signals; and a converter for adding said limited R-G and B-G signals and converting the added R-G and B-G signals into said B-Y and R-Y signals.

14. A color signal processing circuit as claimed in claim 13, wherein said R-G and B-G signals are color difference signals, and said converter includes:

a second delay for delaying an output of said limiter by as many as two periods of said pixel clock; and an adder for adding the color difference signals from said limiter to the color difference signals from said second delay.

15. A color signal processing circuit as claimed in claim 13, wherein said R-G and B-G signals are each 10 bits long, and said limited R-G and B-G signals output from said limiter are each 8 bits long.

16. A color signal processing circuit as claimed in claim 10, wherein said zoom-processing means zoom-processes 8 bits of said B-Y and R-Y signals.

17. A color signal processing circuit as claimed in claim 10, wherein said B-Y and R-Y signals processed in said zoom-processing means are synchronized with said pixel clock.

18. A color signal processing circuit as claimed in claim 10, wherein said zoom-processing means selectively zoom-processes said B-Y and R-Y signals in response to a zoom selection signal indicating selection of a zoom mode.

* * * * *